W. H. CARRIER.
DIFFERENTIAL THERMOSTAT.
APPLICATION FILED OCT. 11, 1907.
902,713.
Patented Nov. 3, 1908.
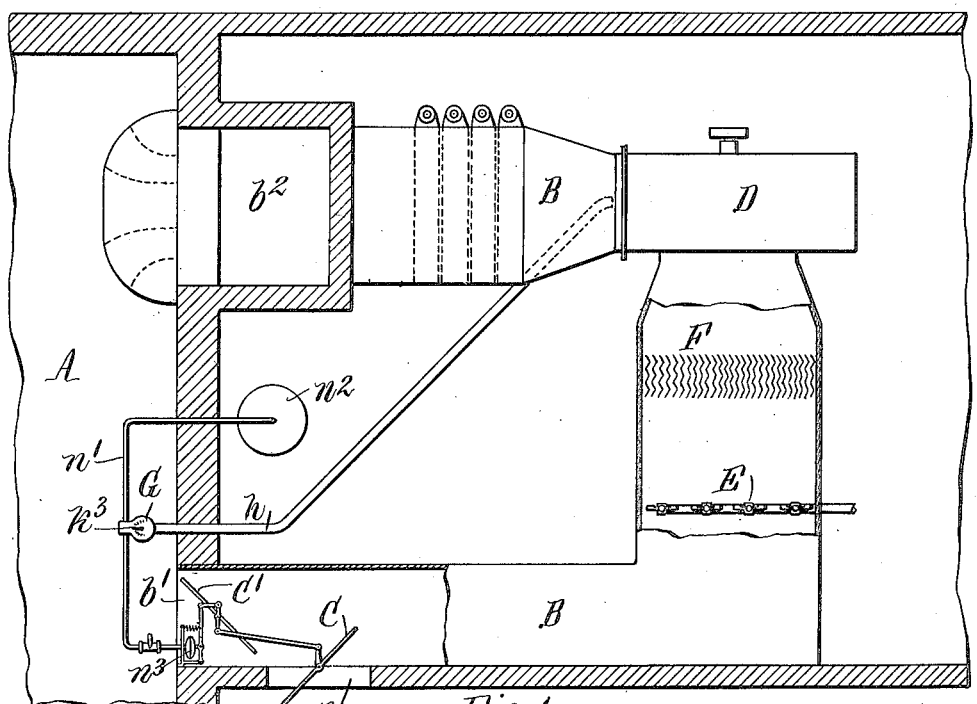
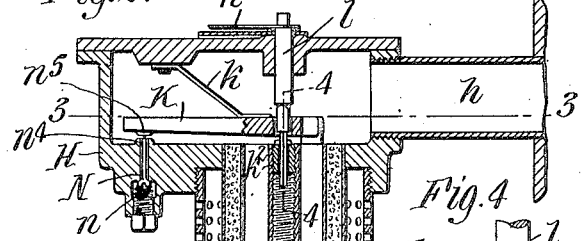
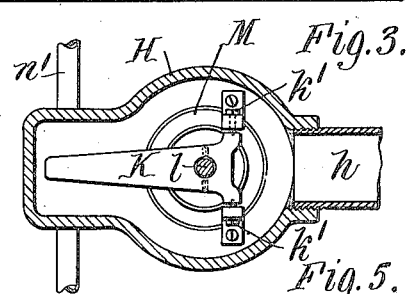
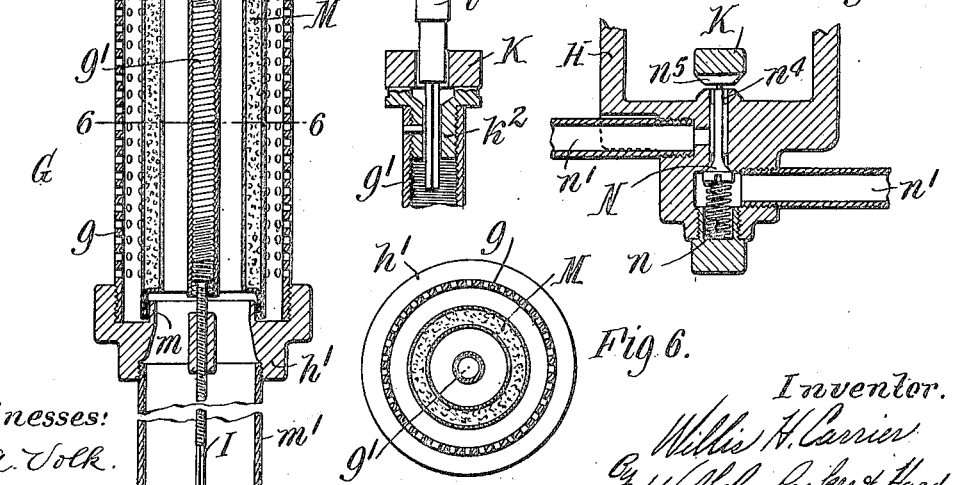
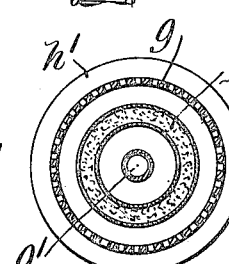
Witnesses:
E. A. Volk.
N. G. Dimond.
Inventor.
Willis H. Carrier
By Wilhelm, Parker & Hand,
Attorneys.

UNITED STATES PATENT OFFICE.

WILLIS H. CARRIER, OF BUFFALO, NEW YORK, ASSIGNOR TO BUFFALO FORGE COMPANY, OF BUFFALO, NEW YORK.

DIFFERENTIAL THERMOSTAT.

No. 902,713.         Specification of Letters Patent.         Patented Nov. 3, 1908.

Application filed October 11, 1907. Serial No. 396,982.

*To all whom it may concern:*

Be it known that I, WILLIS H. CARRIER, a citizen of the United States, residing at Buffalo, in the county of Erie and State of New York, have invented a new and useful Improvement in Differential Thermostats, of which the following is a specification.

This invention relates more particularly to a differential thermostat for automatically regulating the temperature of one of two fluids in such manner as to maintain a definite or predetermined desired difference in the temperatures of said fluids, or a definite relation between such temperatures, notwithstanding temperature changes in the other fluid.

The objects of the invention are to produce an efficient and reliable device of the character stated; and also to so construct the device that it can be adjusted to maintain a constant difference in temperature between the two fluids or any predetermined desired schedule of differences corresponding to variations in temperature of one fluid. These objects are attained by the use of two thermostatic elements which are insulated from each other and arranged so that one is influenced by the temperature changes of one of the fluids and the other by the temperature changes of the other fluid, said elements being so opposed that the thermostatic valve or regulating device operated thereby shall be controlled only by a difference in temperature, or by a certain relation of difference in temperature, of the two fluids, and not merely by fluctuations of temperature in one or both fluids. For adjusting the device to operate in correspondence with various different temperature relations between the two fluids, means are provided for varying the ratio of expansion of one of the thermostatic elements.

The differential thermostat forming the subject of this invention is primarily intended for use in the automatic system of humidity and temperature control disclosed in my application for U. S. Letters Patent filed May 17, 1907, Serial No. 374,215, for controlling the dew point with reference to the room temperature, but the invention is not restricted to such application.

In the accompanying drawings: Figure 1 is a diagrammatic sectional plan of a temperature and humidity regulating apparatus equipped with a differential thermostat embodying the invention. Fig. 2 is a sectional elevation of the thermostat. Fig. 3 is a sectional plan thereof in line 3—3, Fig. 2. Fig. 4 is a fragmentary sectional elevation thereof, on an enlarged scale, in line 4—4, Fig. 2. Fig. 5 is an enlarged sectional elevation of the thermostatic valve. Fig. 6 is a transverse section of the thermostat.

Like letters of reference refer to like parts in the several figures.

A represents a room or building in which the condition of the air is to be controlled; B an air trunk or humidifier having inlet openings $b\ b'$ respectively for outside air and return air from the building, and a discharge opening $b^2$ leading into the building; C C' dampers controlling the inlet openings $b\ b'$; D a fan or device for circulating the air through the trunk or humidifier and discharging it into the building; E sprayers or other suitable means for saturating the air current with moisture; and F an eliminator for removing the free water or moisture from the air.

G represents the differential thermostat, which, in the apparatus illustrated, is employed for regulating the temperature of the air entering the humidifier to maintain the difference in the temperature between the saturated air in the humidifier and that in the building necessary to give a desired temperature and humidity of the air in the building. The thermostat comprises two expansible elements, $g\ g'$, preferably arranged one concentrically within and insulated from the other with one element secured at one end and influenced by the temperature of one fluid, and the other element attached at one end to the free end of the first element and influenced by the temperature of the other fluid and operatively connected to temperature-controlling means for one of said fluids. In the construction shown in the drawings the outer element $g$ is screwed at its upper end into and supported by a hollow box or casing H connected by a pipe or passage $h$ with the humidifier or trunk B, and has a coupling $h'$ screwed on its lower end, while the inner element $g'$ is internally screw-threaded, and a screw-threaded adjusting rod I working in the internal thread of the element also passes through and has a screw-threaded engagement with a central hole in the coupling $h'$. The pitch of the threads on the adjusting screw I and the inner element $g'$ are the same so that by holding the element $g'$ from turning and turning the adjusting screw I one way or the other it will screw farther into or out of the inner element $g'$ and vary the effective expansible length thereof without shifting the element endwise. The upper free end of the inner element $g'$ bears against a lever K which is held on the end of the element by a spring $k$ or other suitable means. The lever K is fulcrumed in the stationary casing H by pivots $k'$ or in any other suitable manner. Preferably a hollow plug $k^2$, Fig. 4, is fixed in the upper end of the inner element and provided at opposite sides with knife edges on which the lever bears. A stem or shaft $l$ journaled in a suitable bearing in the casing H and extending loosely through a hole in the lever K, has a square end loosely engaging in a square hole in the plug $k^2$, or is otherwise fashioned to turn the inner element $g'$. This shaft steadies the free end of the inner element without interfering with the free expansion and contraction thereof, but by holding the adjusting screw I and turning the shaft $l$ one way or the other, the inner element will be screwed down or up on the adjusting rod so as to shift the position of the lever K and require a greater or less expansion or contraction of the element to effect an operative movement of the lever. An index $k^3$ fixed on the shaft $l$ facilitates the adjustment of the inner element.

M represents an annular insulating partition or tube which is arranged between the inner and outer expansible elements and forms an annular chamber around the inner element which communicates at its upper end with the interior of the casing H through a hole in the bottom thereof, so that the inner element will be surrounded and influenced by the air or fluid from the casing H. The insulating partition is preferably made hollow or with double walls and filled with suitable non-conducting material, such as asbestos, to better insulate the elements from each other, and it is secured at its upper end to the casing H while its lower end loosely surrounds an inner flange $m$ on the coupling $h'$ so as not to interfere with the free expansion and contraction of the outer element but to prevent communication between the air or fluids inside and outside of the partition. The outer expansible element is preferably perforated, as shown, to allow the free entrance of the outside air or fluid into the chamber between the outer element and the insulating partition, which air will supplement the partition in insulating the expansible elements from each other. A tube or pipe $m'$ screwed into or otherwise attached to the coupling $h'$ forms a continuation of the chamber surrounding the inner expansible element.

The operation of the thermostat is as follows: The fan D forces the cool saturated air from the humidifier through the casing H and tube or partition M of the thermostat. The inner expansible element is therefore influenced by the temperature of this air while the outer expansible element is influenced by the surrounding air of the apartment in which the thermostat is located. The two thermostat elements preferably have the same coefficient of expansion and consequently if like changes of temperature occur in the two separate bodies of air the expansion or contraction of one element will offset that of the other element and the position of the lever K will remain unchanged. Thus so long as a predetermined difference of temperature exists between the temperatures of the two fluids, notwithstanding fluctuations in their temperatures, there will be no operative action of the thermostatic lever. If, however, the temperatures of the two fluids change unequally, or only one varies, then the expansion or contraction of the two thermostatic elements will not be equal and the lever will be moved one way or the other, more or less, depending upon the conditions, and through the regulating means will raise or lower the temperature of one fluid to reëstablish the required difference of temperature between the two fluids. By operating the adjusting screw I as explained, the effective expansible length of the inner thermostat element can be changed as required without altering its relation to the lever K, to secure various constant differences of temperature between the two fluids, while by adjusting the inner thermostat element by means of the shaft $l$ its relation to the lever K as well as its effective expansible length is altered so that the thermostat operates in accordance with a variable instead of a constant difference of temperatures between the two fluids.

The movement of the thermostat lever K can be transmitted by any known or suitable means for performing the regulating action. In the apparatus shown, the free end of the lever bears on the stem of a valve N in a chamber in the casing H. This valve is pressed against its seat and its stem held against the lever K by a suitable spring $n$ and controls a pipe or passage $n'$ leading from a compressed air reservoir $n^2$ to an ordinary diaphragm or device $n^3$ for operating the dampers C and C'. An escape duct $n^4$ leads from the valve chamber into the casing and a valve $n^5$ on the lever K is adapted to close the end of this duct. When the lever swings downwardly by reason of a greater expansion of the outer than of the inner element, it will close the exhaust port and open the valve N, whereupon compressed air will flow from the reservoir $n^2$ to the diaphragm $n^3$, thereby expanding the latter and more or less closing one and opening the other of the dampers C C'. If the lever is moved in the opposite direction by a less expansion of the outer than of the inner element, the valve N will be closed and the exhaust port opened, which allows the escape of the air from the diaphragm and effects the opposite movement of the dampers.

I claim as my invention:

1. The combination of two thermostat elements arranged with one element secured at one end and the other element attached to the free end of the first element, an insulating partition between said elements for separating the mediums influencing said elements, and regulating means operated by said second element, substantially as set forth.

2. The combination of two thermostat elements arranged one within the other with the outer element secured at one end and the inner element attached to the free end of the outer element, said outer element being influenced by the temperature of the surrounding medium, an annular insulating partition between said elements and forming a chamber around the inner element for a separate medium, and regulating means for one of said mediums operated by said inner element, substantially as set forth.

3. The combination of two thermostat elements arranged one within the other, a hollow casing to which said outer element is secured at one end, said inner element being attached to the free end of said outer element, an annular insulating partition between said elements forming a chamber surrounding said inner element which communicates with said casing, and a regulating device in said casing operated by said inner element, substantially as set forth.

4. The combination of two thermostat elements arranged with one element secured at one end, an adjustable connection between the other element and the free end of the first element for regulating the effective expansible length of said second element without affecting its position, an insulating partition between said elements for separating the mediums influencing said elements, and regulating means operated by said second element, substantially as set forth.

5. The combination of two thermostat elements arranged with one element secured at one end, an adjustable connection between the other element and the free end of the first element for regulating the effective expansible length of said second element without affecting its position, additional means for adjusting said second element on said adjustable connection, an insulating partition between said elements for separating the mediums influencing said elements, and regulating means operated by said second element, substantially as set forth.

6. The combination of two thermostat elements arranged with one element secured at one end, an adjusting screw connecting the other element to the free end of the first element, said screw having threaded connections of like pitch with both elements, an insulating partition between said elements for separating the mediums influencing said elements, and regulating means operated by said second element, substantially as set forth.

7. The combination of two thermostat elements arranged with one element secured at one end, an adjusting screw connecting the other element to the free end of the first element, said screw having threaded connections of like pitch with both elements, additional means for adjusting said second element on said adjusting screw, an insulating partition between said elements for separating the mediums influencing said elements, and regulating means operated by said second element, substantially as set forth.

8. The combination of a differential thermostat having two elements which are separately influenced by different mediums, and means controlled by the differential action of said thermostat elements for maintaining a definite relation between the temperatures of said two mediums, substantially as set forth.

9. The combination of a humidifier, means for circulating air through the same and discharging the humidified air into a building, a differential thermostat having two elements insulated from each other, one influenced by the humidified air from said humidifier and the other element influenced by the air of said building, and means controlled by said differential thermostat for regulating the temperature of air in said humidifier, substantially as set forth.

10. The combination of a humidifier, means for circulating air through the same and discharging the humidified air into a building, dampers for regulating the proportion of external air and return air from said building entering said humidifier, a differential thermostat having two elements insulated from each other, one influenced by the humidified air from said humidifier, and the other element influenced by the air of said building, and means controlled by said differential thermostat for regulating the position of said dampers, substantially as set forth.

Witness my hand, this 7th day of October, 1907.

WILLIS H. CARRIER.

Witnesses:
C. W. PARKER,
C. B. HORNBECK.